US012374840B1

(12) United States Patent
Wadleigh

(10) Patent No.: US 12,374,840 B1
(45) Date of Patent: Jul. 29, 2025

(54) SIGNAL-MODIFYING AUDIO PATCH CABLE THAT INTERCEPTS STUDIO VOICES FROM SURROUND SOUND

(71) Applicant: Gregory A Wadleigh, Scottsdale, AZ (US)

(72) Inventor: Gregory A Wadleigh, Scottsdale, AZ (US)

(*) Notice: Subject to any disclaimer, the term of this patent is extended or adjusted under 35 U.S.C. 154(b) by 0 days.

(21) Appl. No.: 18/639,318

(22) Filed: Apr. 18, 2024

Related U.S. Application Data

(60) Provisional application No. 63/609,691, filed on Dec. 13, 2023.

(51) Int. Cl.
*H01R 24/58* (2011.01)

(52) U.S. Cl.
CPC .................................... *H01R 24/58* (2013.01)

(58) Field of Classification Search
CPC ...................................................... H01R 24/58
See application file for complete search history.

(56) References Cited

U.S. PATENT DOCUMENTS 4,965,877 A * 10/1990 Gunn ................... G10H 1/0058 439/502
9,455,528 B1 * 9/2016 Chao ...................... H01R 13/64
11,100,035 B2 * 8/2021 Mohan ................... H01R 24/58
2006/0240705 A1 * 10/2006 Takagi ................... G11B 20/10 439/502
2008/0242147 A1 * 10/2008 Warkrat ............... H04R 1/1033 439/607.01
2008/0309313 A1 * 12/2008 Farrar ..................... G06F 1/266 323/351
2011/0183543 A1 * 7/2011 Xie ........................ H01R 13/72 439/502
2013/0059464 A1 * 3/2013 Pan ........................ H01R 31/06 439/502
2015/0029399 A1 * 1/2015 Heo ....................... H04N 5/645 348/554
2020/0194950 A1 * 6/2020 D'Addario ............. H01R 24/58

* cited by examiner

*Primary Examiner* — Abdullah A Riyami
*Assistant Examiner* — Nader J Alhawamdeh
(74) *Attorney, Agent, or Firm* — Plager Schack LLP; Mark H. Plager; Alexis Saenz

(57) ABSTRACT

An audio patch cable includes a male connector end with a tip for a first audio signal, a ring for a second audio signal, and a sleeve. A first input contact is connected to the tip. A second input contact is connected to the ring. A third input contact is connected to the sleeve. A female connecter end is coupled to the male connector end. The female connector end includes: a first output contact, a second output contact, a third output contact, and a female plug. A first conductive line is connected to the first input contact and to the third output contact. A second conductive line is connected to the second input contact and to the first output contact and to the second output contact.

8 Claims, 3 Drawing Sheets

SIGNAL-MODIFYING AUDIO PATCH CABLE THAT INTERCEPTS STUDIO VOICES FROM SURROUND SOUND

CROSS-REFERENCE TO RELATED APPLICATIONS

This application claims priority to provisional patent application U.S. Ser. No. 63/609,691 filed on Dec. 13, 2023, the entire contents of which, including drawings and specification are herein incorporated by reference.

BACKGROUND

The embodiments described herein relate generally to audio peripheral devices, and more particularly, to a signal-modifying audio patch cable that intercepts studio voices from surround sound.

A patch cable, also known as a patch cord or jumper cable, is a short length of cable that is used to connect electronic devices together. The cable is typically used to establish a connection between two devices, for example, an audio source and an audio output device, allowing them to communicate and transfer audio signals.

Audio patch cables are primarily used to transmit audio signals between devices such as musical instruments, amplifiers, mixing consoles, audio interfaces, and speakers. They play a vital role in ensuring clear and accurate sound reproduction. Audio patch cables come in different configurations and connectors, including ⅛-inch TRS (Tip-Ring-Sleeve), RCA, XLR, and MIDI, among others. Each connector type serves a specific purpose, enabling seamless connections between different audio devices.

SUMMARY

In one aspect of the subject disclosure, an audio patch cable is disclosed. The audio patch cable includes a male connector end. The male connector end includes: a tip component configured to carry a first audio signal, ring component configured to carry a second audio signal, and a sleeve component. A first insulator is positioned between the tip component and the ring component. A second insulator is positioned between the ring component and the sleeve component. A first input contact is connected to the tip component. A second input contact is connected to the ring component. A third input contact is connected to the sleeve component. A female connecter end is coupled to the male connector end. The female connector end includes: a first output contact configured to carry a first output channel signal, a second output contact configured to carry a second output channel signal, a third output contact, and a female plug connected to the first output contact, the second output contact, and the third output contact. A first conductive line is connected to the first input contact and to the third output contact. A second conductive line is connected to the second input contact and to the first output contact and to the second output contact.

In another aspect, an audio patch cable is disclosed. The audio patch cable includes a male connector end. The male connector end includes: a tip component configured to carry a first audio signal, ring component configured to carry a second audio signal, and a sleeve component. A first insulator is positioned between the tip component and the ring component. A second insulator is positioned between the ring component and the sleeve component. A first input contact is connected to the tip component. A second input contact is connected to the ring component. A third input contact is connected to the sleeve component. A female connecter end is coupled to the male connector end. The female connector end includes: a first output contact configured to carry a first output channel signal, a second output contact configured to carry a second output channel signal, a third output contact, and a female plug connected to the first output contact, the second output contact, and the third output contact. A first conductive line is connected to the second input contact and to the third output contact. A second conductive line is connected to the first input contact and to the first output contact and to the second output contact.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed invention provide an audio patch cable that eliminates one of the audio signal channels from the output. Embodiments of the subject audio patch cable are usable in audio output environments where the end user wants to eliminate part of the output, for example, the voice output from a video or live television broadcast.

TRS connectors have been used in audio applications to provide an enhanced audio experience. As may be appreciated, the modified TRS connector and patch cable provide an unexpected result that is contrary to the goal of conventional audio patch cables. The subject device modifies the audio output so that an unconventional consumption of the viewing/listening of an audio/visual work is experienced. For example, the device may transmit only ambient sounds to the audio output such as the sounds made by players in a live game. The play-by-play commentary which normally resides on the other channel is eliminated under the configuration of embodiments of the audio patch cable described below.

In one exemplary application, the subject device is connected to a device that works under the Dolby® Audio technology (or other two-dimensional audio technology). The output from the subject device may differ when used in applications that are not operating under the Dolby® Audio technology format. As should also be understood, the resultant output may depend on how the audio signals are formatted. For example, if a broadcast designates the positive channel as carrying an audio signal associated with live commentary and the negative channel is designated for carrying an audio signal associated with the ambient sound of the arena or stadium, depending on which embodiment described below is used, the output will sound different because the end user will only be subjected to either the live commentary or the ambient sounds.

Figure 1:
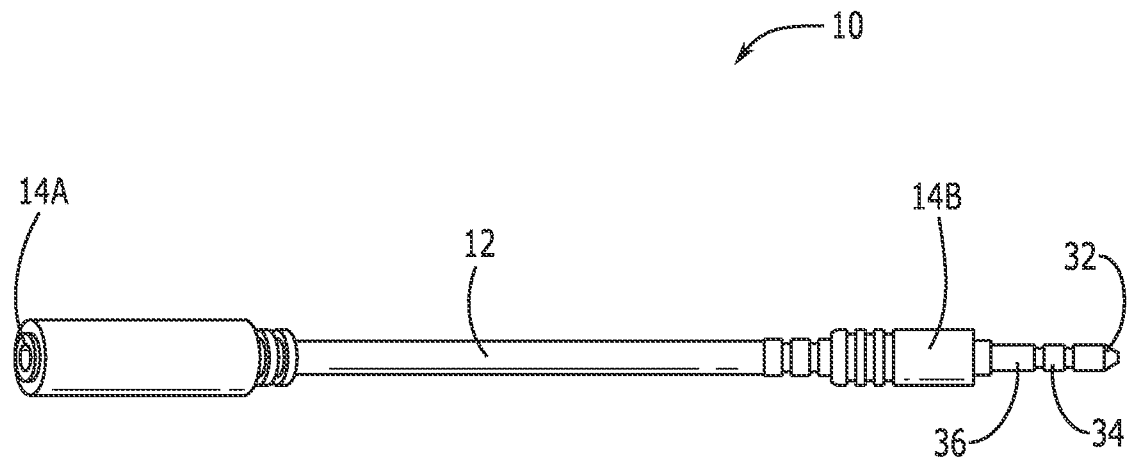
FIG. 1 is a perspective view of an audio patch cable according to an embodiment of the subject technology.

FIG. 1 shows an audio patch cable 10 according to an exemplary embodiment. The audio patch cable 10 generally includes a female stereo audio plug (sometimes also referred to as a "connector") 14A connected to a male stereo audio plug 14B by a wire 12. The male stereo audio plug 14B may include three channel components: a tip 32, a ring 34, and a sleeve 36. The tip 32 may be configured for use as a positive (or "hot") audio signal. The ring 34 may be configured for use as a negative (or "cold") audio signal. And the sleeve 36 may be a reference line. As will be understood, the signal carrying responsibilities for each component may be switched depending on the end application.

Figure 2:
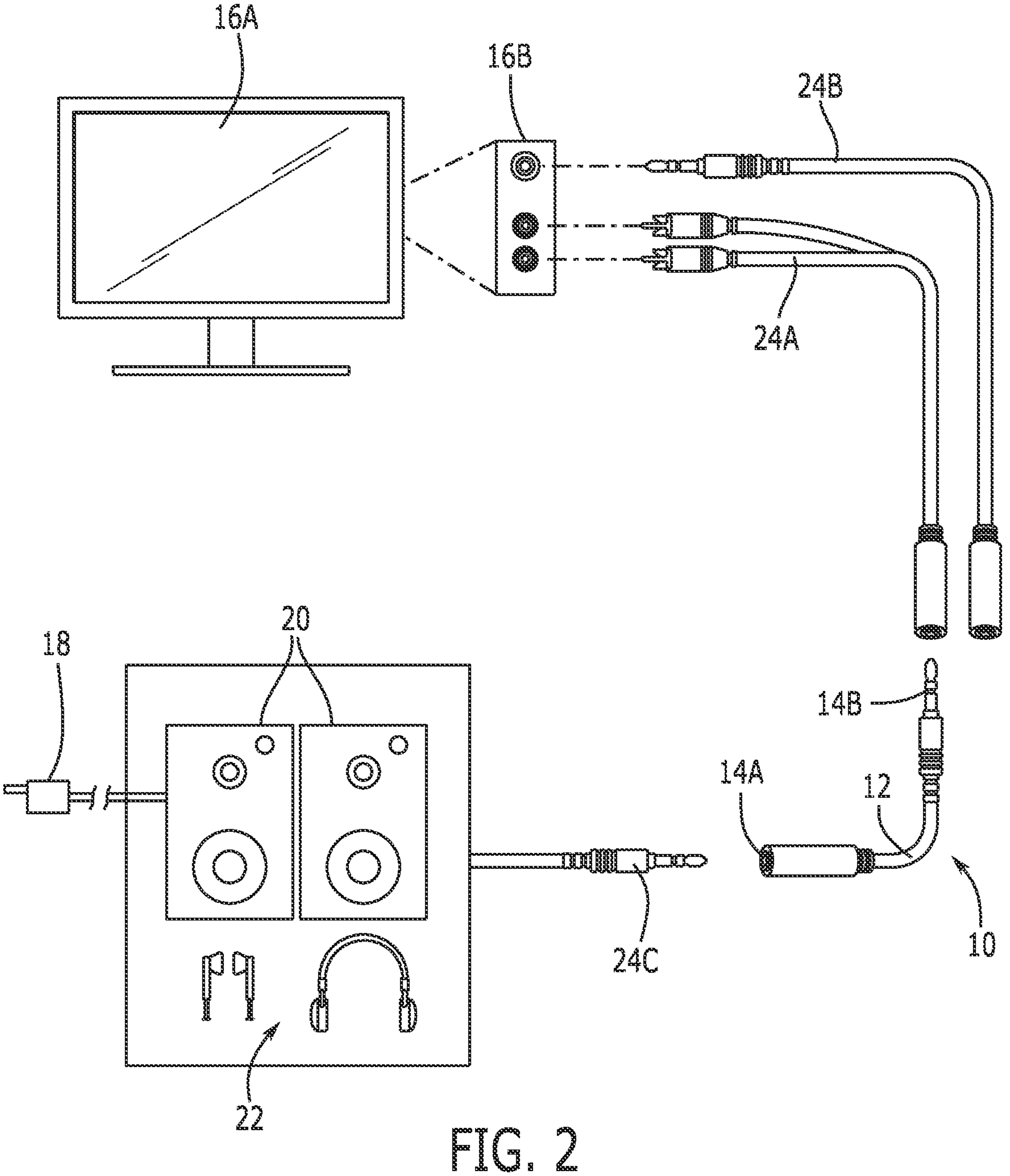
FIG. 2 is a diagrammatic view of an audio/visual system incorporating the audio patch cable of FIG. 1, according to an embodiment of the subject technology.

FIG. 2 shows an audio/visual output system including usage of the audio patch cable 10, according to an exemplary embodiment. An audio source 16A may be for example, a television or other display device with integrated audio capabilities accessed via an audio output panel 16B. One or more audio plugs 24A may be plugged into the audio panel 16B to transmit audio signals to one or more audio output devices (examples shown include loudspeakers 20 and headphones 22). The audio output devices may in some cases need an electrical power source 18. The male stereo audio plug 14B may be connected to an output end of the audio plug 24A. The female stereo audio plug 14A may be connected to an input end of the audio output device(s). As shown in the example, the audio patch cable 10 is receiving audio signals from a dual channel source. When connected, the audio patch cable will convert the audio signals from the audio source 16A into a modified signal that eliminates the signal from one of the channels.

Figure 3:
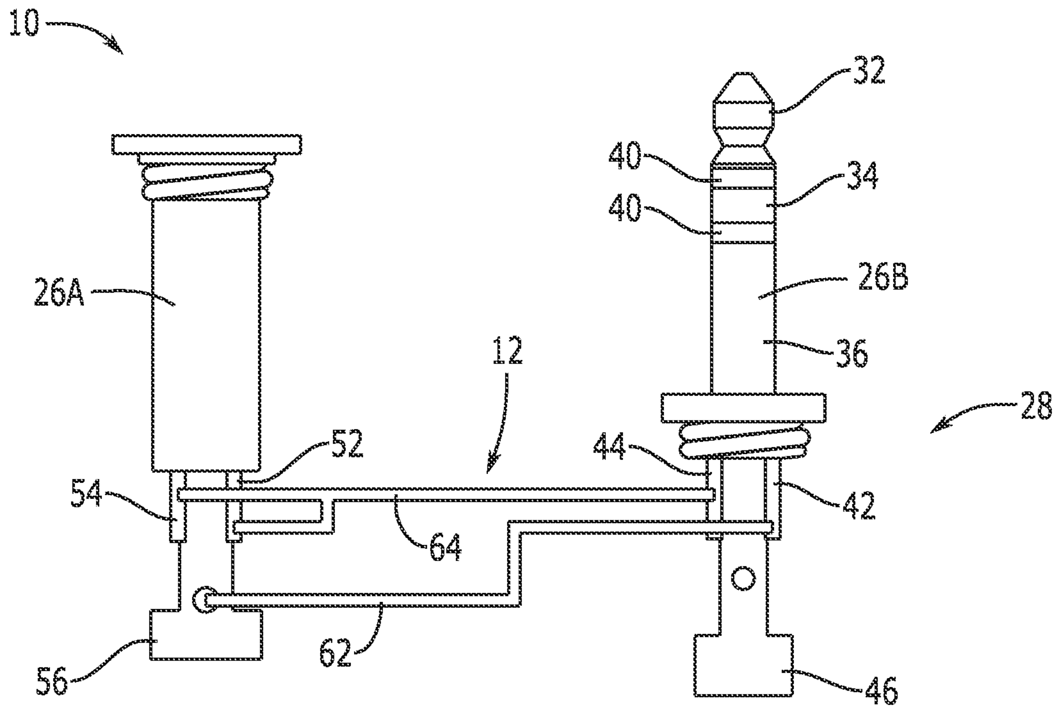
FIG. 3 is an internal view of connections for the audio patch cable of FIG. 1, according to an embodiment of the subject technology.
Figure 4:
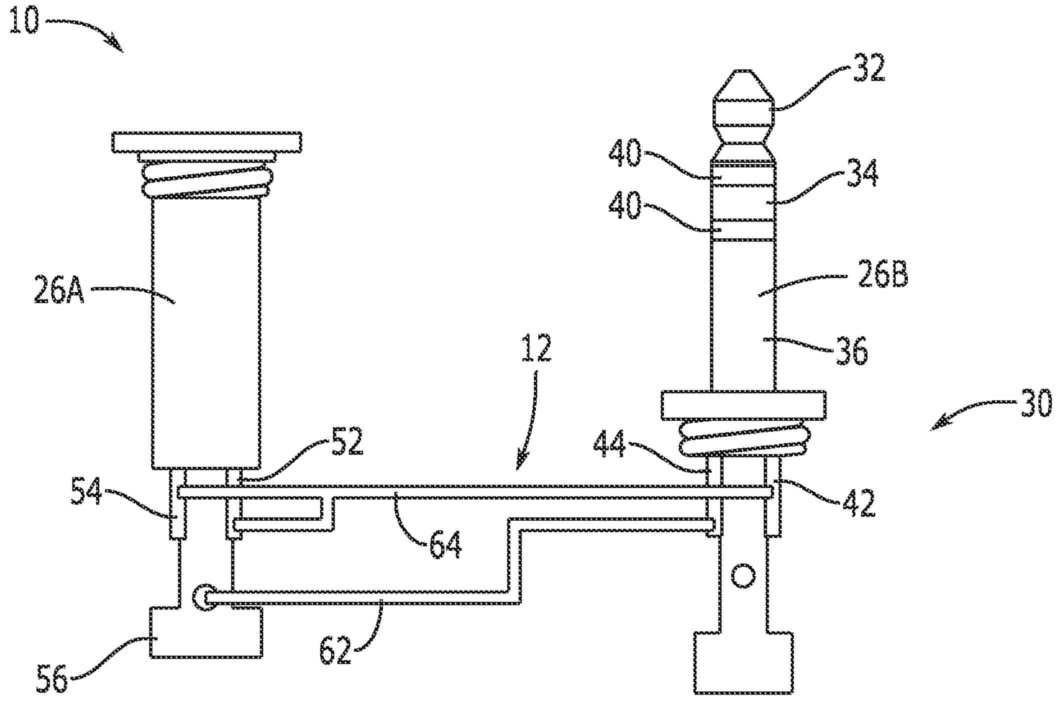
FIG. 4 is an internal view of connections for an audio patch cable according to another embodiment of the subject technology.

Referring now to FIGS. 3 and 4, details of the audio patch cable 10 are shown according to exemplary embodiments. In FIG. 3, the male connector 14B end also shows a first insulator 40 positioned between the tip 32 component and the ring 34 component. A second insulator 40 may be positioned between the ring 34 component and the sleeve 36 component. The male connector 14B may also include a first input contact 42 connected to the tip 32 component. A second input contact 44 may be connected to the ring 34 component. A third input contact 46 may be connected to the sleeve 36 component. The female connector 14A end includes a first output contact 52 that carries a first output channel signal. A second output contact 54 carries a second output channel signal. A third output contact 56 may be connected to a reference channel. The audio patch cable may also include a first conductive line 62 connected to the first input contact 42 and to the third output contact 56. A second conductive line 64 may be connected to the second input contact 44 and to the first output contact 52 and to the second output contact 54. As can be seen, the third input contact 46 is disconnected from all the output contacts 52, 54, and 56. In operation, audio signals from the tip 32 component are connected to the reference channel of output contact 56 when transferred from the male stereo audio plug 14B to the female stereo audio plug 14A. All sound from the positive (or "hot") audio signal is sent to the reference channel. The audio signal from the negative (or "cold") channel (via the ring component 34) is transferred to both of the two output contacts 52 and 54 on the female side.

FIG. 4 shows an embodiment similar to FIG. 3 except that the positive channel remains intact while the right channel is sent to the reference channel. The second input contact 44 connected to the ring 34 component is connected to the third output contact 56. In this embodiment, only the tip 32 component is connected to both of the output contacts 52 and 54, leaving only one channel to be heard in the output.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An audio patch cable, comprising:
- a male connector end, wherein the male connector end includes:
  - a tip component configured to carry a first audio signal,
  - a ring component configured to carry a second audio signal, and
  - a sleeve component;
- a first insulator positioned between the tip component and the ring component;
- a second insulator positioned between the ring component and the sleeve component;
- a first input contact connected to the tip component;
- a second input contact connected to the ring component;
- a third input contact connected to the sleeve component;
- a female connecter end coupled to the male connector end, wherein the female connector end includes:
  - a first output contact configured to carry a first output channel signal,
  - a second output contact configured to carry a second output channel signal,
  - a third output contact, and
  - a female plug connected to the first output contact, the second output contact, and the third output contact;
- a first conductive line connected to the first input contact and to the third output contact; and
- a second conductive line connected to the second input contact and to the first output contact and to the second output contact.

2. The audio patch cable of claim 1, wherein the second audio signal includes a voice signal.

3. The audio patch cable of claim 2, wherein only the positive audio signal is output by the female end connector.

4. The audio patch cable of claim 1, wherein the third input contact is disconnected from the first output contact, the second output contact, and the third output contact.

5. An audio patch cable, comprising:
- a male connector end, wherein the male connector end includes:
  - a tip component configured to carry a positive audio signal,
  - a ring component configured to carry a negative audio signal, and
  - a sleeve component configured to carry a common audio signal;
- a first insulator positioned between the tip component and the ring component;
- a second insulator positioned between the rig component and the sleeve component;
- a first input contact connected to the tip component;
- a second input contact connected to the ring component;
- a third input contact connected to the sleeve component;
- a female connecter end coupled to the male connector end, wherein the female connector end includes:
  - a first output contact configured to carry a first output channel signal,
  - a second output contact configured to carry a second output channel signal, a third output contact configured to carry a third output channel signal, and a female plug connected to the first output contact, the second output contact, and the third output contact;

a first conductive line connected to the second input contact and to the third output contact; and a second conductive line connected to the first input contact and to the first output contact and to the second output contact.

6. The audio patch cable of claim 5, wherein the second audio signal includes a voice signal.

7. The audio patch cable of claim 6, wherein only the first audio signal is output by the female end connector.

8. The audio patch cable of claim 5, wherein the third input contact is disconnected from the first output contact, the second output contact, and the third output contact.

* * * * *